United States Patent
Kukurugya et al.

(10) Patent No.: US 12,157,928 B2
(45) Date of Patent: Dec. 3, 2024

(54) PROCESS FOR RECOVERING NON-FERROUS METALS FROM INDUSTRIAL MINERAL RESIDUES

(71) Applicant: VITO NV, Mol (BE)

(72) Inventors: Frantisek Kukurugya, Mol (BE); Liesbeth Horckmans, Mol (BE); Jeroen Spooren, Mol (BE)

(73) Assignee: VITO NV, Mol (BE)

( * ) Notice: Subject to any disclaimer, the term of this patent is extended or adjusted under 35 U.S.C. 154(b) by 828 days.

(21) Appl. No.: 17/254,750

(22) PCT Filed: Jun. 28, 2019

(86) PCT No.: PCT/EP2019/067502
§ 371 (c)(1),
(2) Date: Dec. 21, 2020

(87) PCT Pub. No.: WO2020/002697
PCT Pub. Date: Jan. 2, 2020

(65) Prior Publication Data
US 2021/0292869 A1  Sep. 23, 2021

(30) Foreign Application Priority Data
Jun. 29, 2018  (EP) .................... 18180859

(51) Int. Cl.
*C22B 19/02* (2006.01)
*C22B 1/02* (2006.01)
(Continued)

(52) U.S. Cl.
CPC ............... *C22B 19/22* (2013.01); *C22B 1/02* (2013.01); *C22B 3/06* (2013.01); *C22B 7/02* (2013.01); *C22B 19/02* (2013.01); *C22B 19/30* (2013.01)

(58) Field of Classification Search
CPC .................................................... C22C 19/22
See application file for complete search history.

(56) References Cited

U.S. PATENT DOCUMENTS

| | | | |
|---|---|---|---|
| 4,081,506 A | 3/1978 | Proplesch et al. | |
| 4,102,951 A * | 7/1978 | Lawson | C01G 49/06 423/532 |
| 4,510,028 A * | 4/1985 | Bolton | C22B 19/22 423/140 |

FOREIGN PATENT DOCUMENTS

| | | |
|---|---|---|
| CN | 102443701 A | 5/2012 |
| CN | 103789556 A | 5/2014 |

(Continued)

OTHER PUBLICATIONS

Guo-min Jiang, et al. "Recovery of valuable metals from zinc leaching residue by sulfate roasting and water leaching"; Transactions of Nonferrous Metals Society of China: English Edition; vol. 27, No. 5, May 5, 2017.

(Continued)

*Primary Examiner* — Christopher S Kessler
(74) *Attorney, Agent, or Firm* — Kolitch Romano Dascenzo Gates LLC

(57) ABSTRACT

A process is described for recovering a non-ferrous metal from a first solid residue comprising iron. In this process, the first solid residue is mixed with a second solid residue including sulphur, thereby obtaining a particulate mixture. The particulate mixture is subjected to a roasting step at a temperature of at least 650° C. to obtain a roasted mixture, and the roasted mixture is subjected to leaching in a liquid at a pH of at least 5.5 to obtain a solution enriched with the non-ferrous metal.

18 Claims, 5 Drawing Sheets

(51) Int. Cl.
*C22B 3/00* (2006.01)
*C22B 3/06* (2006.01)
*C22B 7/02* (2006.01)
*C22B 19/30* (2006.01)

(56) References Cited

FOREIGN PATENT DOCUMENTS

| EP | 3333272 A1 | 6/2018 |
|---|---|---|
| FR | 2463189 A1 | 2/1981 |

OTHER PUBLICATIONS

European Patent Office, International Search Report and Written Opinion of the International Searching Authority, dated Aug. 6, 2019, in PCT/EP2019/067502, which is the international application to this U.S. application.

* cited by examiner

PROCESS FOR RECOVERING NON-FERROUS METALS FROM INDUSTRIAL MINERAL RESIDUES

TECHNICAL FIELD

The present disclosure is related to a process for recovering valuable non-ferrous metals from residues originating from metallurgical processes, such as hydro- and pyrometallurgical processes.

INTRODUCTION

Metallurgical processing of zinc produces large quantities of hazardous waste streams. Particularly, iron is present as an undesirable constituent of zinc concentrates, calcine oxides and zinc oxide dust. In the leaching process of concentrates, calcines or dust, iron dissolves into the solution with zinc and other desired metals. Iron constitutes a severe impurity in zinc solution and must be removed before zinc electrolysis. In most existing electrolytic zinc plants, iron is removed by its precipitation as jarosite or goethite, and the jarosite process is more widely used than the goethite process. Due to the presence of heavy metals (e.g. As, Cd, Pb, Zn), these hazardous waste streams are currently disposed of in dedicated landfills to contain the risk they could pose to the environment and human health. The enormous amount of waste produced every year makes jarosite and goethite residues one of the biggest environmental problems in the zinc production industry. Fine-grained waste streams coming from steelmaking industry, such as Electric Arc Furnace (EAF) or Basic Oxygen Furnace (BOF) dust and sludge also contain heavy metals and thus present serious environmental problems, especially taking into account the large amounts of such fine-grained wastes being produced annually.

FR 2463189 describes a process which is based on sulphation roasting of goethite sludge in a temperature range of 500–750° C. Particularly, a roasting temperature between 550° C. and 650° C. ensures selective sulphation of non-ferrous metals from dried goethite sludge. As a sulphate source either $H_2SO_4$ or $SO_{3(g)}$ were used. However, $SO_{3(g)}$ can be obtained by decomposition of $H_2SO_4$ or other sulphates. After sulphation, the residue was leached in an aqueous solution of $H_2SO_4$ at a pH between 1 and 2. The leaching temperature is preferably between 20° C. and 60° C. Under such conditions, it was shown that 90-92% Zn, 86-88% In and 93-94% Cu can be leached with low Fe dissolution (1.8-6%).

To reach high recovery of valuable metals from these residues, aggressive conditions, such as acidic leaching agents need to be used, which can result in an unwanted high dissolution rate of Fe. Moreover, goethite residue and fine-grained waste streams coming from steelmaking industry often contain Zn as stable Zn-ferrite ($ZnFe_2O_4$) spinel what makes selective Zn recovery difficult.

More information on this topic may be found in Jiang Gou-Min et al.: Recovery of valuable metals from zinc leaching residue by sulfate roasting and water leaching, TRANSACTIONS OF NONFERROUS METALS SOCIETY OF CHINA, vol. 27, no. 5, May 2017, 1180-1187.

SUMMARY

The present disclosure aims to selectively recover valuable non-ferrous metals (such as, though not limited to, Zn, Ni and Pb) and possibly remove other hazardous contaminants (e.g. As) from residues of metallurgical processes. It is an aim to valorize the (iron-containing) residue matrix material depleted from the non-ferrous metals. It is an aim of the present disclosure to provide a more economical process for selective recovery of non-ferrous metals from such residues. It is also an aim to provide a more environmentally friendly process for recovery of non-ferrous metals from such residues.

Thus, according to the present disclosure, a process for recovering a non-ferrous metal is provided. The non-ferrous metal is comprised in a first solid residue, which is advantageously a granular or particulate material and advantageously comprises iron, in particular iron oxide. The non-ferrous metal can be bound in an iron (oxide) matrix in the first solid residue. The first solid residue is mixed with a second solid residue comprising sulphur, advantageously as a sulphate mineral, thereby obtaining a particulate mixture. The second solid residue is advantageously a granular or particulate material. The particulate mixture is subjected to a roasting step, advantageously under oxidizing conditions, at a temperature of at least 650° C. to obtain a roasted mixture. The roasted mixture is then subjected to leaching under mild conditions, e.g. in a liquid at pH of 5.5 or higher, e.g. pH between 6 and 8; to obtain a leachate which is enriched with the non-ferrous metal. Advantageous non-ferrous metals for use in processes as described herein are zinc, lead and nickel.

In aspects of the present disclosure, mixing a non-ferrous metal and iron containing waste stream with a sulphur containing waste stream, advantageously in at least a stoichiometric amount of sulphur to the non-ferrous metal was found to significantly enhance the leaching of the non-ferrous metal after roasting.

Aspects of the present disclosure are based on the sulphation of the non-ferrous metal, in particular zinc, which is advantageously present in the residue stream, such as goethite residue, Electric Arc Furnace (EAF) dust or Basic Oxygen Furnace (BOF)-sludge as a stable iron spinel, e.g. zinc ferrite ($ZnFe_2O_4$) or zinc franklinite ($ZnFe_2O_4$), to form soluble $ZnSO_4$, by mixing the residue with a further mineral waste stream, advantageously produced by the non-ferrous industry, comprising sulphur (i.e. elemental sulphur, sulphide anions or a sulphidic oxyanion), such as jarosite, and roasting said mixture; followed by water leaching to obtain a solution which is enriched with the non-ferrous metal. As a result, aggressive conditions as described in the prior art are advantageously avoided.

It has surprisingly been found that mixing the residue comprising the non-ferrous metal with a mineral waste stream comprising sulphur, avoids the need or formation of aggressive acidic leaching solutions. Furthermore, this has the benefit of co-processing another waste material. As a result, processes according to the present invention allow for being carried out solely based on waste materials and virgin materials are advantageously not used in processes according to the present invention. One of the advantages of the present process is that these wastes have the same problems: i.e. they both contain the same kind of hazardous heavy metals. This means that both will need to be treated to remove these compounds. By combining them the problem of both wastes will be resolved at the same time. It has further been found that the processes as described herein result in limited dissolution of iron or of toxic elements (i.e. As, Cd, Pb), allowing direct application of the leached solution, e.g. in case of zinc in a Zn-electrolysis treatment to recover the non-ferrous metal.

Further benefits of aspects of the present disclosure are a higher extraction of the non-ferrous metal (e.g. >95% in case of Zn) and a very limited Fe (0.02%) and Pb (0.1%) dissolution. Limited Fe dissolution is highly beneficial for subsequent treatment of the leached solution, as no additional purification steps to remove Fe are needed. In addition, leaching is advantageously performed in neutral pH conditions, allowing to use water as leaching agent. As no acid needs to be added to the leaching step after the roasting, costs for additional acid can be avoided and the process is rendered more environment-friendly.

Yet a further advantage is that two or more possibly hazardous waste streams can be treated together, which increases supply reliability of a roasting plant which needs high throughput to be economically sustainable.

BRIEF DESCRIPTION OF THE DRAWINGS

Aspects of the disclosure will now be described in more detail with reference to the appended drawings, wherein same reference numerals illustrate same features and wherein.

DETAILED DESCRIPTION

Figure 1:
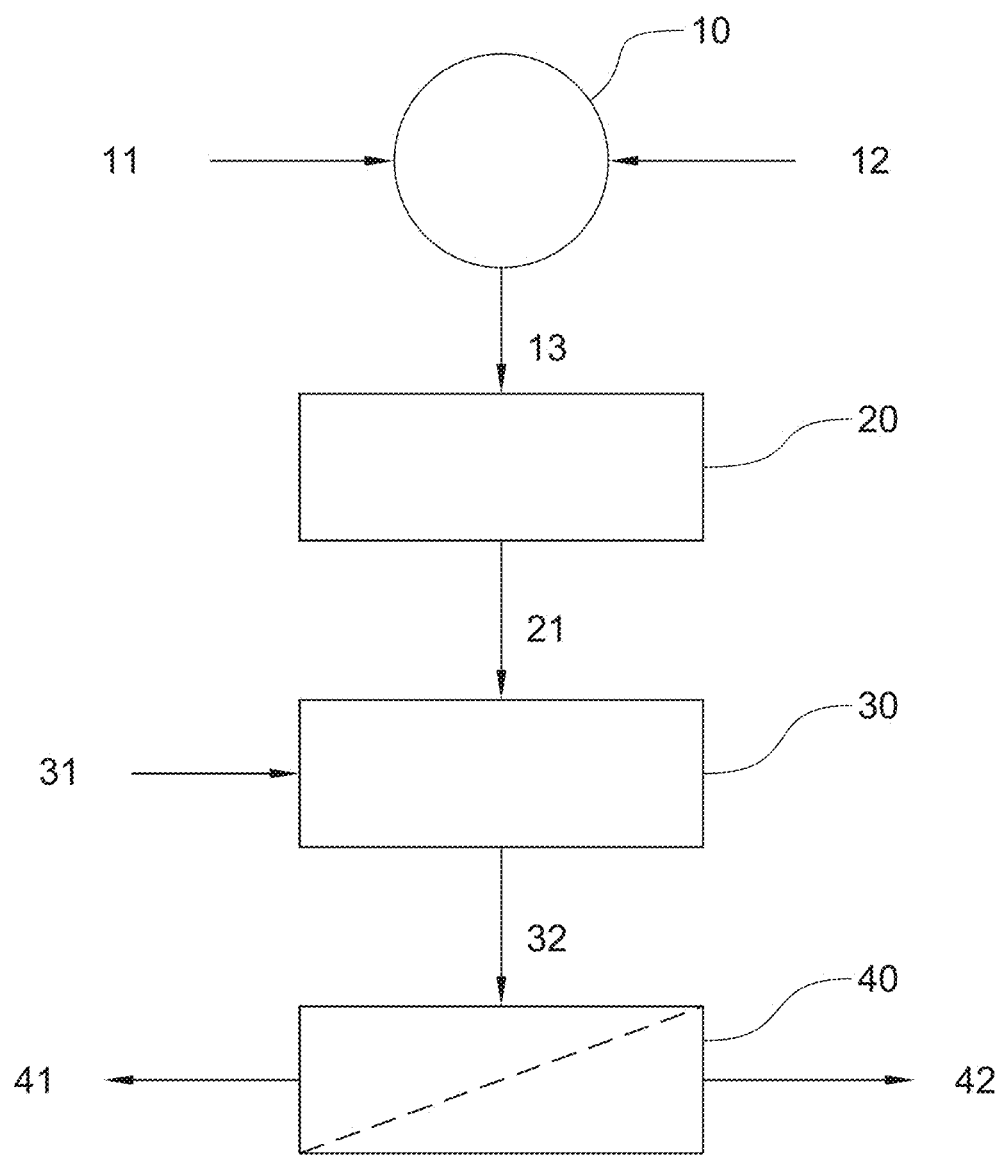
FIG. 1 represents a flow diagram of a process according to aspects of the present disclosure.

Referring to FIG. 1, processes for recovering a non-ferrous metal from a solid residue 11 of a metallurgical process, in particular from a metallurgical process waste of the non-ferrous metal, comprises a first step 10 of mixing the residue 11 with a second solid material 12. The residue 11 and the solid material 12 are advantageously granular materials. The first residue 11 comprises the non-ferrous metal that is to be recovered and comprises iron. Advantageously, the non-ferrous metal is bound as an iron oxide, in particular an iron spinel in residue 11. Non-limiting examples of suitable iron oxides are zinc ferrite or zinc franklinite ($ZnFe_2O_4$) and nickel iron oxide. The first residue can comprise at least 15% by (dry) weight Fe, preferably at least 20% by weight, preferably at least 25% by weight. Advantageously, the amount of non-ferrous metal iron oxide (iron spinel) in the first residue is at least 20% by (dry) weight, advantageously at least 25% by weight, advantageously at least 30% by dry weight of the first residue.

According to an aspect of the present disclosure, the first residue 11 is mixed with a second solid material 12 comprising sulphur. The second solid material 12 is a solid residue. The amount of sulphur in the second material 12 is advantageously at least 15% by (dry) weight, advantageously at least 20% by weight, advantageously at least 25% by weight, advantageously at least 30% by weight. The sulphur is advantageously present in the second material as a sulphate mineral and/or as elemental sulphur. The amount of sulphate mineral in the second stream is advantageously at least 15% by (dry) weight, advantageously at least 20% by weight, advantageously at least 25% by weight, advantageously at least 30% by weight. A suitable example of a sulphate mineral is jarosite, iron sulphate, ferric sulphate, sodium or potassium sulphate, sodium or potassium bisulphate, etc. The second stream is advantageously a solid residue, in particular a residue of a metallurgical process. By way of example, different hydrometallurgical processes for producing zinc result in production of goethite residues and jarosite residues. Both residues can advantageously be used in processes according to the present disclosure. The goethite residues can be used as the first residue 11, whereas the jarosite residues can be used as the second residue 12.

Advantageously, the second solid residue also comprises the non-ferrous metal which one intends to recover from the first residue 11. The amount of said non-ferrous metal in the second residue 12 is advantageously at least 0.5% by (dry) weight, advantageously at least 1% by (dry) weight, advantageously at least 1.5% by (dry) weight, advantageously at least about 2% by (dry) weight of the second residue 12.

The first and second residues are advantageously dry residues. If moist, they can be dried, e.g. at 40-105° C. during a suitable amount of time, e.g. between 12 hours and 48 hours. The particle size distribution of either one or both the first residue 11 and the second residue 12, and/or of the resulting mixture advantageously has a 50 percentile diameter ($d_{50}$) of 100 μm or less, advantageously 80 μm or less. Advantageously, $d_{50}$ is at least 1 μm, advantageously at least 5 μm. Advantageously, the 90 percentile diameter ($d_{90}$) of either one or both residues, or the mixture is 100 μm or less. If coarse, the particle size of the residues and/or the mixture can be reduced to suitable granulometry, e.g. by milling.

The first and second residues are mixed in suitable proportions. In particular, the mixture 13 advantageously has a content of sulphur at least equal to the stoichiometric amount of the non-ferrous metal in the mixture. It is however advantageous to provide sulphur in excess as compared to the stoichiometric amount of the non-ferrous metal, advantageously a ratio of sulphur to non-ferrous metal is at least 2, advantageously at least 4, advantageously at least 6, advantageously at least 8, advantageously at least 10, since some of the sulphur will be lost as $SO_3$ gas.

The mixture 13 obtained in mixing step 10 is fed to a roasting step 20. The chemical principle behind the roasting step is based on the reaction:

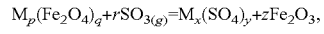

where M denotes the non-ferrous metal and $SO_3$ are gas emissions formed during roasting (by oxidation of S present in the second residue) which react with the non-ferrous metal iron oxide of the first residue causing conversion of the iron oxide to a water-soluble sulphate salt of the non-ferrous metal.

The roasting step is an oxidative roasting, advantageously at a temperature of at least 650° C., advantageously at least 675° C. The roasting temperature is advantageously 800° C. or less, allowing for conversion of the non-ferrous metal iron oxide into the non-ferrous metal sulphate. Roasting is advantageously performed at atmospheric pressure, implying that an open reactor may be used, i.e. a reactor open to the outside atmosphere. The residence time of the mixture 13 at the roasting temperature is advantageously at least 20 minutes, advantageously at least 30 minutes, advantageously at least 40 minutes, and advantageously 10 hours or less, advantageously 5 hours or less, advantageously 4 hours or less.

The roasted material 21 obtained from roasting step 20 is subsequently fed to a leaching step 30. Advantageously, leaching is performed in a liquid at neutral pH, in particular a pH of at least 5.5, advantageously a pH of at least 6, advantageously a pH of at least 6.5. The pH is advantageously 8 or less. An advantageous leaching liquid 31 is water, in particular distilled water.

Leaching is advantageously performed at a liquid to solid ratio (of leaching liquid 31 to roasted material 21) of at least 1, advantageously at least 5, advantageously at least 10. Leaching is advantageously performed at a temperature between 10° C. and 90° C., advantageously between 15° C. and 75° C., advantageously between 20° C. and 50° C. The residence time of the roasted material in the leaching liquid can be very short. Given the conversion in a soluble salt, the extraction of the non-ferrous metal into the leaching solution can even be achieved by washing of the roasted material, in a batch or continuous process. Advantageously, the residence time of the roasted material in the leaching liquid, is at least 10 minutes, advantageously at least 0.5 hours, advantageously at least 1 hour.

Leaching allows for extracting the non-ferrous metal from the roasted material into solution, while the iron will remain incorporated in the solid material. The leaching step 30 hence results in a stream 32 comprising a leachate (leached solution) 41 and residue material 42, advantageously depleted in the non-ferrous metal. Stream 32 may be a suspension. It has surprisingly been found that by using a mixture of residues, an efficient leaching can be carried out under mild conditions, thereby obviating the need of using aggressive conditions or highly acidic leaching agents. Another beneficial effect of aspects of the present disclosure is that iron and/or contaminants advantageously will not leach out, or only leach out in minimal amounts. This facilitates post treatment steps on both the leachate and the remaining solid material.

Known post-treatment steps may be carried out on the stream 32 as required. A first post-treatment step may involve a filtration step 40 to separate the solid residue material 42 from the leachate 41. Further suitable leaching and/or filtration steps may be contemplated, e.g. to remove contaminants from the leachate 41 and/or from the residue material 42.

Any one of the process steps as described above may be carried out in a batchwise or a continuous manner.

EXAMPLES

The following examples relate to experiments carried out with zinc as the non-ferrous metal. The first solid residue was goethite residue from zinc production, comprising zinc as the non-ferrous metal one intends to recover, and the second solid residue was jarosite residue from zinc production. It will be convenient to note that jarosite residue also comprises the non-ferrous metal, in this case zinc, one intends to recover from the first solid residue. The chemical principle behind this process is based on the reaction:

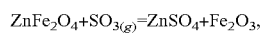

$$ZnFe_2O_4+SO_{3(g)}=ZnSO_4+Fe_2O_3,$$

where $SO_3$ gas emissions formed during roasting (by oxidation of S and/or decomposition of sulphate/jarosite present in the non-ferrous sulphur-containing residue) react with $ZnFe_2O_4$ present in zinc and iron containing residue causing conversion of Zn-ferrite to water soluble salt ($ZnSO_4$). It will however be convenient to note that non-ferrous metal waste materials produced by other industries, such as Electric Arc Furnace (EAF) dust or Basic Oxygen Furnace (BOF) sludge, produced by the steel industry, are also iron-rich and contain the stable Zn-ferrite at elevated concentrations, and are accordingly useful as the non-ferrous metal containing residue in the process according to the disclosure.

Chemical compositions of solid materials have been determined by EDXRF (energy dispersive x-ray fluorescence), an art known analytical technique used for the detection of chemical elements. Chemical compositions of liquid samples were determined by inductively coupled plasma optical emission spectrometry (ICP-OES), after acid digestion of the sample.

Example 1: Mixture Proportions

Starting materials goethite and jarosite sludge with chemical composition listed in Table 1, were mixed together in different weight ratios (1:1, 1:2, 1:3 and 1:4) and subjected to sulphation roasting.

TABLE 1

Chemical composition of the starting goethite and jarosite sludge (dried at 40° C. for 24 h)

| Sample | Composition [wt. %] | | | | | | | |
|---|---|---|---|---|---|---|---|---|
| | Fe | Zn | Pb | S | As | Al | Ca | Cu |
| Goethite sludge | 31.8 | 5.73 | 1.61 | 9.24 | 0.38 | 0.82 | 5.91 | 0.38 |
| Jarosite sludge | 16.4 | 1.94 | 2.80 | 32.6 | 0.56 | 0.50 | 2.44 | n.a. |

Roasting was conducted by heating the mixtures at a rate of 120° C./h to 700° C., at atmospheric pressure in an open reactor, i.e. a reactor open to the outside atmosphere). After dwelling for 1 h at 700° C., the samples were cooled and manually milled in a mortar to disintegrate the agglomerates formed during roasting. The chemical compositions of the mixtures obtained after sulphation roasting are listed in Table 2.

TABLE 2

Chemical composition of the tested goethite-jarosite mixtures after roasting at 700° C.

| Goethite:Jarosite ratio | Composition [wt. %] | | | | | | | | Mass loss after roasting [wt. %] |
|---|---|---|---|---|---|---|---|---|---|
| | Fe | Zn | Pb | S | As | Al | Ca | Cu | |
| (1:1) | 33.93 | 5.31 | 2.97 | 9.86 | 0.76 | 0.81 | 4.69 | 0.30 | 28 |
| (1:2) | 32.85 | 4.80 | 3.47 | 9.86 | 0.89 | 0.82 | 4.26 | 0.25 | 33 |
| (1:3) | 31.81 | 4.47 | 3.65 | 9.97 | 0.94 | 0.93 | 4.06 | 0.21 | 35 |
| (1:4) | 31.4 | 4.27 | 3.77 | 10.2 | 1.01 | 0.97 | 4.08 | 0.18 | 37 |

These mixtures after sulphation roasting were leached in water in order to selectively leach Zn. Water leaching was carried out for 1 h at a liquid to solid (L/S) ratio 10 and temperature 25° C. After leaching and filtration the obtained leachates were analysed by ICP-OES, and the solid residues were subjected to EDXRF analysis.

Figure 2:
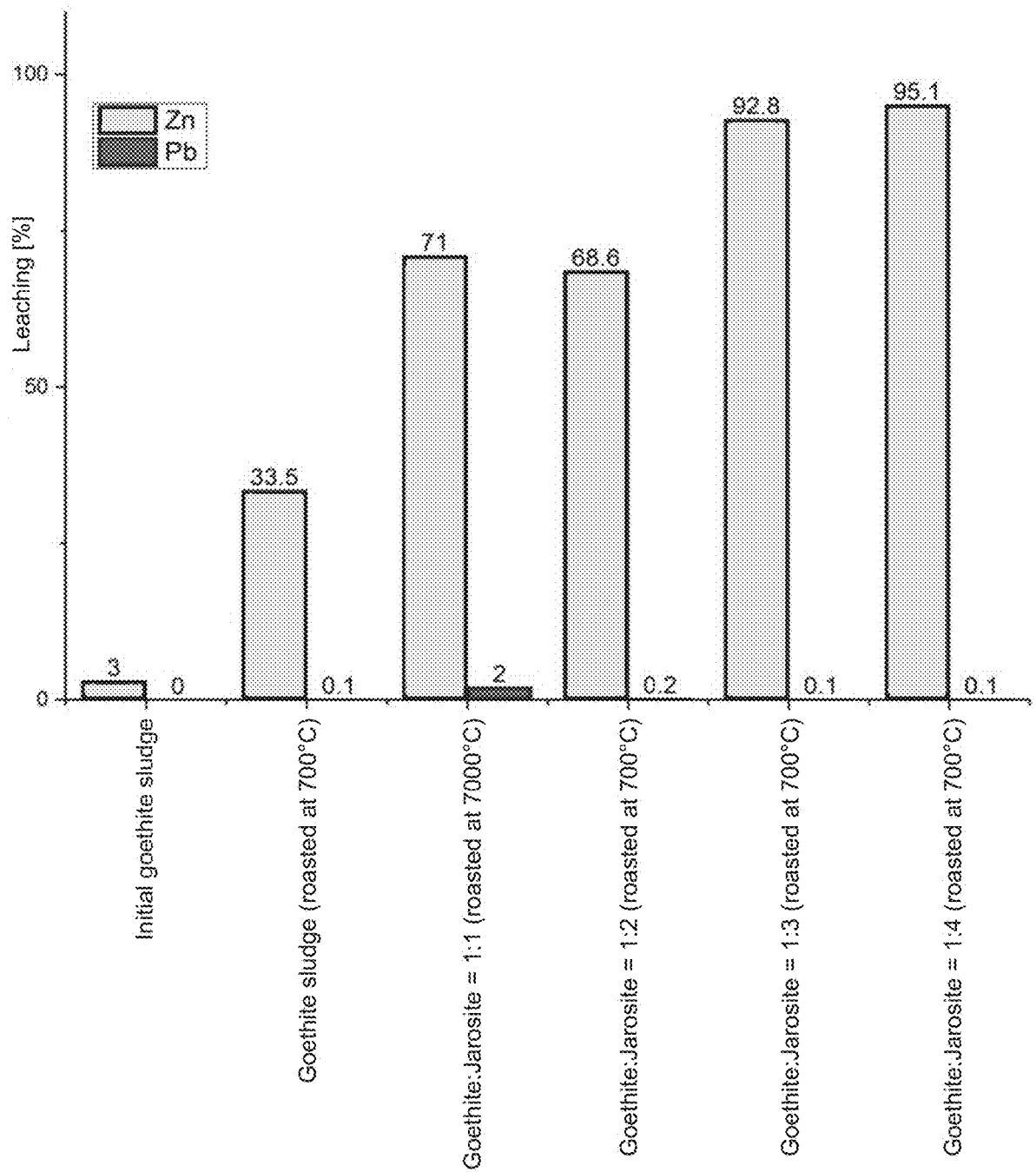
FIG. 2 represents leaching results of zinc (Zn) and lead (Pb) in water for different roasted materials according to aspects of the present disclosure.

Results of water leaching for different goethite-jarosite mixtures are shown in FIG. 2. For comparison, results from water leaching of untreated goethite sludge and goethite sludge roasted at 700° C. are reported as well.

FIG. 2 clearly shows that in case of mixture 1:4, more than 95% of Zn can be selectively leached with no (or limited) Pb co-dissolution. Already at a 1:1 ratio, corresponding to more or less stoichiometric amounts there is a significant impact on the amount of extracted Zn, which can be selectively leached out of the roasted materials. In fact at any of the tested ratios, the leachate is thus enriched in zinc and devoid of other metals to e.g. enable direct recovery of zinc by means of electrolysis.

The chemical compositions of the leachate and solid residue after water leaching of mixture 1:4 of the solid residue are shown in Table 3.

TABLE 3

Leachate and solid residue chemical compositions after water leaching

| | Fe | Zn | Pb | S | As | Al | Ca | Cu | pH |
|---|---|---|---|---|---|---|---|---|---|
| Leachate [mg/L] | 5 | 4779 | 3 | n.a. | 0.6 | 6 | 585 | 159 | 4.3 |
| Solid residue [wt. %] | 39.1 | 0.43 | 4.91 | 6.03 | 1.31 | 1.15 | 3.98 | 0.06 | — |

As can be seen from Table 3, a leachate with high Zn concentration and low level of impurities can be obtained by water leaching after sulphation roasting of mixture goethite and jarosite in the ratio of 1:4. For this sample of goethite/jarosite mixture at ratio 1:4, the experimental results of FIG. 2 showed that more that 95% of Zn can be selectively leached out. In contrast, when Zn-ferrite containing waste stream (goethite residue) was treated separately (without mixing with the non-ferrous metallic waste stream comprising sulphur, i.e. jarosite residue) by roasting and water leaching only 30% of Zn was leached out.

Example 2: Post-Treatment Steps

Figure 3:
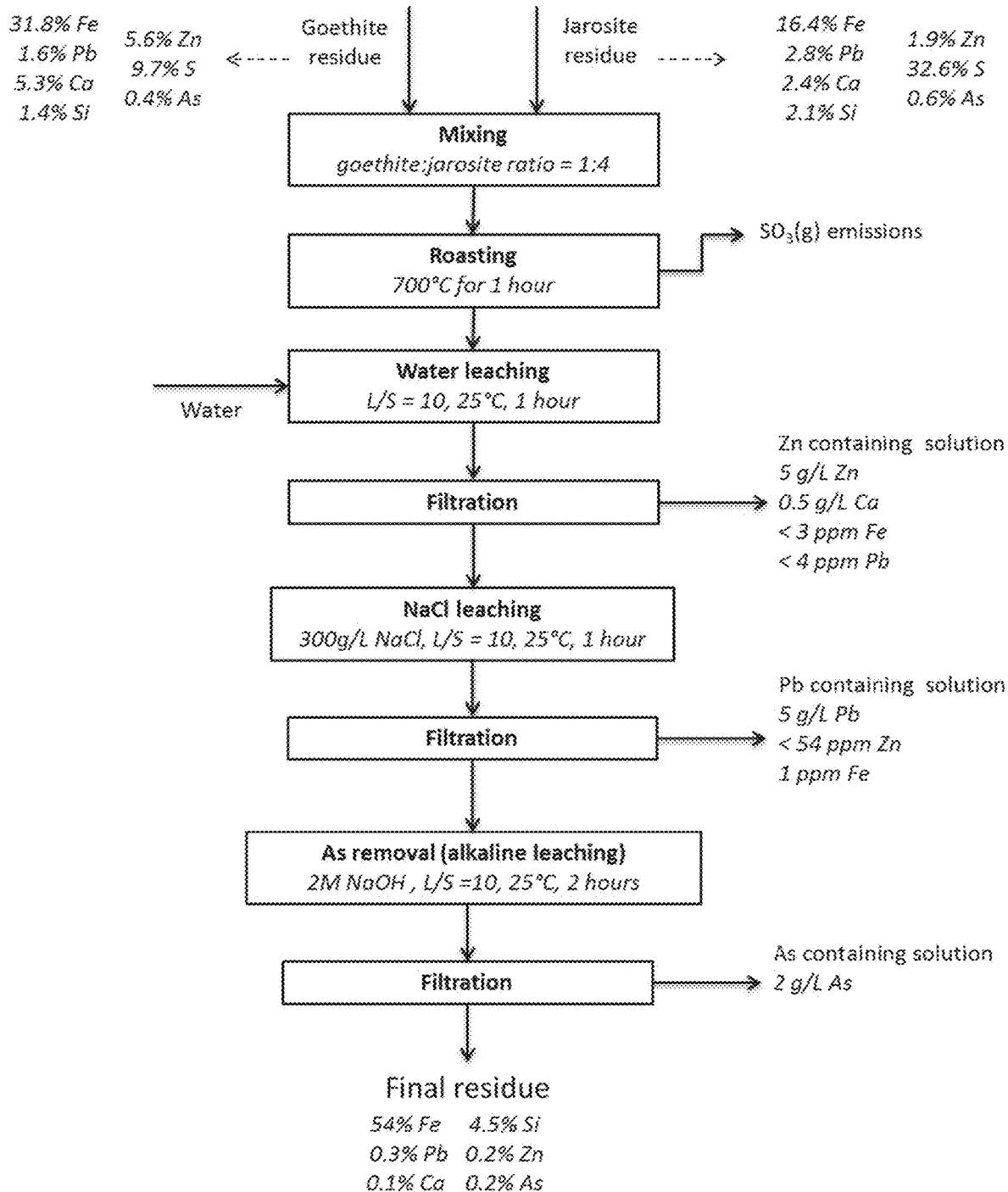
FIG. 3 represents a detailed flow diagram including post treatment steps for recovery of zinc according to aspects of the present disclosure.

The solid residue as obtained from example 1 can be further processed by selective leaching steps, e.g. to remove Pb and As. A suitable flow diagram is shown in FIG. 3, in particular for a mixture of goethite to jarosite at ratio 1:4. The mixing, roasting and water leaching steps are identical to Example 1 above.

A first filtration step 40 was carried out following water leaching to separate the leachate 41, being the solution enriched in zinc, from the solid material 42, depleted in zinc. The leachate comprised 5 g/L Zn, 0.5 g/L Ca and less than 3 ppm Fe and less than 4 ppm Pb.

A subsequent leaching step 50 is carried out on the solid material 42. The solid material 42 was leached in a salt solution of 300 g/L NaCl at L/S=10 for two hours at 25° C. The leaching suspension 51 from leaching step 50 was fed to a filtration step 60 to separate leachate 61 enriched in Pb, and solid residue 62 depleted in Pb. Leachate 61 comprised 5 g/L Pb, less than 54 ppm Zn and 1 ppm Fe.

Solid residue 62 was subjected to a further leaching step 70 for removing As. An alkaline leaching with 2M NaOH at L/S ratio 10 for 2 hours at 25° C. was performed. Following leaching 70, the suspension was fed to a filtration step 80 to separate the leachate 81 enriched in As from the solid residue 82, depleted in As. Leachate 81 comprised 2 g/L As, whereas the solid residue 82 comprised 54 wt % Fe, 4.5 wt % Si, 0.3 wt % Pb, 0.2 wt % Zn, 0.1 wt % Ca and 0.2 wt % As. Compared to the initial compositions, the solid residue 82 has significantly lower amounts of Pb and As. Therefore, the leaching steps 50 and 70 with NaCl and NaOH solution allow to selectively remove further toxic elements like lead and arsenic (Pb and As).

Example 3: Influence of Roasting Temperature on Leaching of Contaminants

Figure 4:
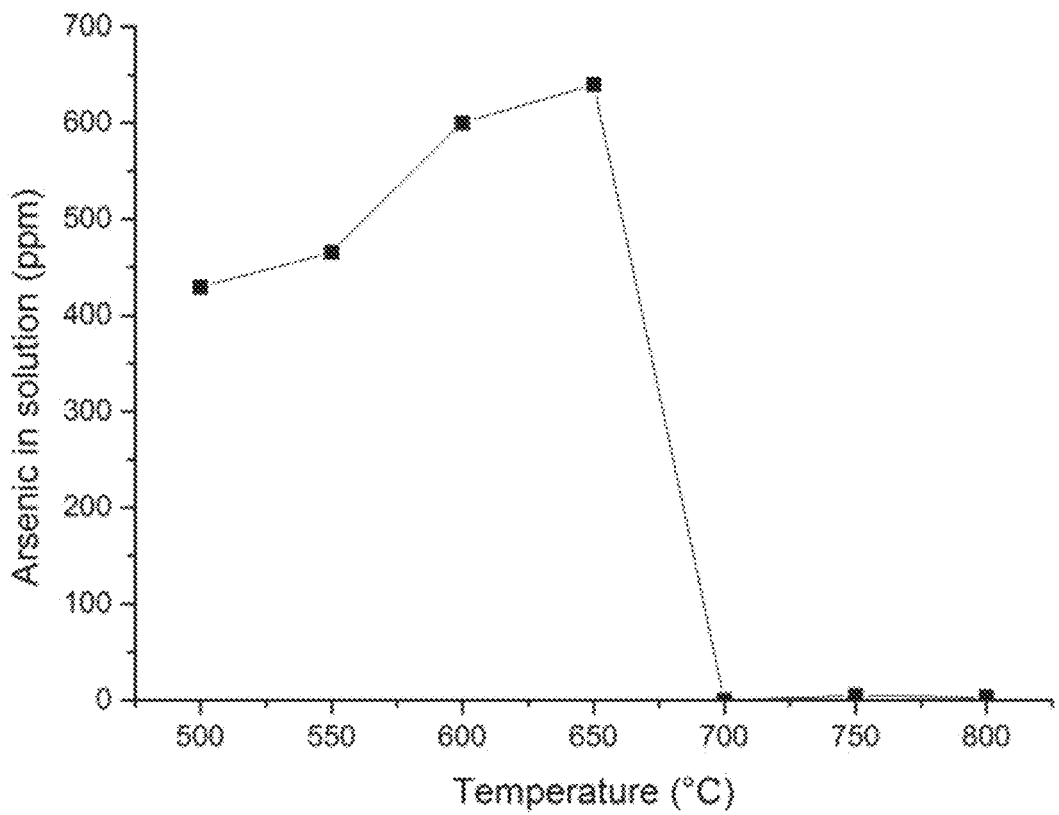
FIG. 4 represents a graph plotting the amount of As in the leachate of water leaching (L/S ratio 10, 1 hour, 25° C.) following roasting of a mixture of goethite residue and jarosite residue in weight ratio 1:4 at different temperatures.

Using jarosite as the sulfur containing residue, it has been found that this material will incorporate and prevent toxic elements like arsenic from leaching into the leachate containing the non-ferrous metal like zinc. For example, Arsenic is typically present in waste streams in the form of arsenate ($AsO_4^{3-}$). During roasting it will partly replace $SO_4^{2-}$ in the jarosite structure $Pb_{0.5}Fe_3(SO_4)_2(OH)_6$. As evident from the graph of FIG. 4, roasting may influence the (further) bonding of such contaminants in the residue structure in a positive way. Roasting temperature may be an important parameter. Referring to FIG. 4, at roasting temperatures of about 675° C. onwards, there is no detectable leaching of arsenic into the leachate from water leaching following roasting of pure jarosite residue (all process conditions identical to Example 2).

Example 4: Using Other Residues

It will be convenient to note that even though the above examples have been carried out with goethite residues and jarosite residues, mineral waste materials produced by other industries, such as Electric Arc Furnace (EAF) fines/waste or Basic Oxygen Furnace (BOF) fines/waste, such as produced by steelmaking processes, are also iron-rich and contain the stable Zn-ferrite at elevated concentrations.

In order to test the feasibility with other waste streams, jarosite residue, i.e. the sulfur containing waste material, was mixed with Fe-rich sludge (BOF sludge) originating from steelmaking industry in a weight ratio 1:4 of BOF fines to jarosite residue. The chemical compositions of the jarosite sludge and the BOF sludge are listed in Table 4. As seen from Table 4, both jarosite and BOF sludge contain Zn. BOF sludge contains almost 5% of Zn, which is mostly present as franklinite ($ZnFe_2O_4$).

TABLE 4

Chemical composition of jarosite sludge and BOF dust

| | Composition [wt. %] | | | | | | |
|---|---|---|---|---|---|---|---|
| | Fe | Zn | Pb | S | As | Al | Ca |
| Jarosite sludge (non-roasted) | 16.4 | 1.94 | 2.80 | 32.6 | 0.56 | 0.50 | 2.44 |
| BOF sludge (steelmaking) | 48.2 | 4.86 | 0.18 | 0.38 | 0.01 | 0.34 | 11.1 |

Jarosite sludge and BOF fines were mixed in a mortar and subsequently roasted at 700° C. for 1 h (heating rate 120° C./h). The roasting was performed at atmospheric pressure. The purpose of this experiment was to test the conversion of stable $ZnFe_2O_4$, present in BOF dust, into water soluble $ZnSO_4$ by reacting with $SO_{3(g)}$ formed during roasting of jarosite sludge (the same principle as in Example 1). The chemical composition of the mixture after roasting is listed in Table 5.

TABLE 5

Chemical composition of the mixture BOF fines and jarosite sludge after sulphation roasting at 700° C.

| BOF fines:Jarosite sludge ratio | Composition [wt. %] | | | | | | | | Mass loss after roasting [wt. %] |
|---|---|---|---|---|---|---|---|---|---|
| | Fe | Zn | Pb | S | As | Al | Ca | Cu | |
| (1:4) | 33.4 | 3.64 | 3.15 | 9.28 | 0.87 | 0.65 | 4.28 | n.a. | 30% |

The roasted mixture was leached in distilled water. Leaching was carried out for 1 h at L/S ratio 10 and temperature 25° C. After leaching and filtration the obtained leachates were analysed by ICP-OES and the solid residues were subjected to XRF analysis.

Figure 5:
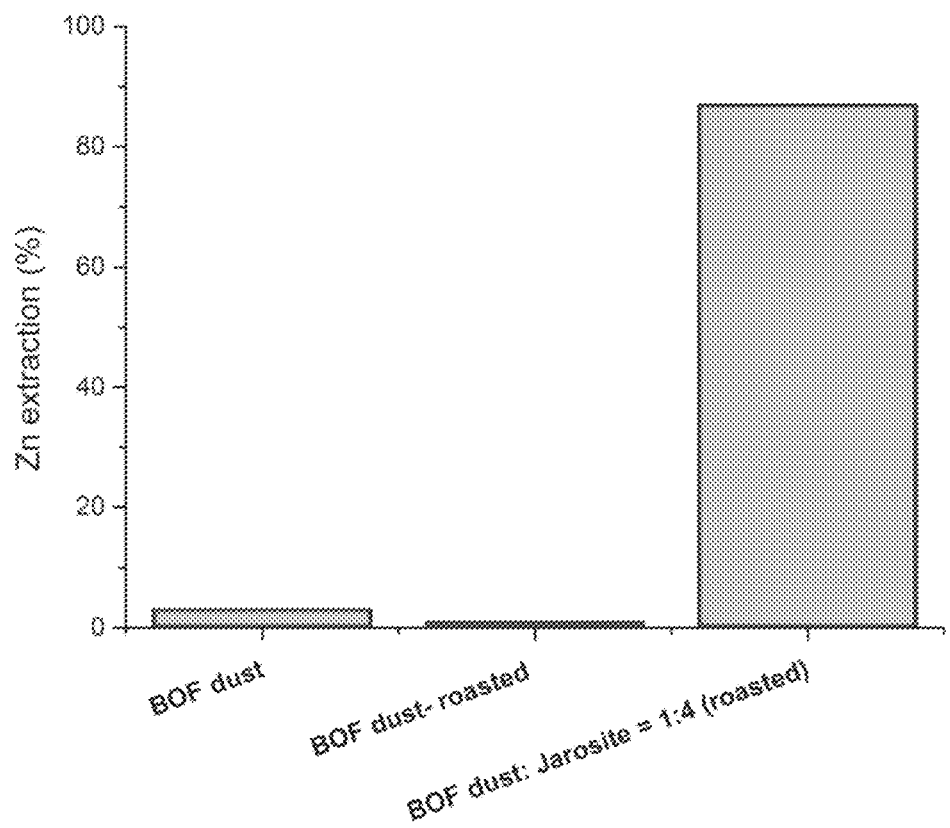
FIG. 5 represents experimental results of Zn recovery through roasting and water leaching of a mixture of Basic Oxygen Furnace sludge and jarosite residue according to Example 4.

Results of the water leaching are shown in FIG. 5. For comparison, results from water leaching of untreated BOF sludge and BOF sludge roasted at 700° C. (i.e. in the absence of jarosite) are reported as well. Almost no Zn was leached after water leaching of 100% BOF fines and roasted BOF fines. However, by mixing with jarosite sludge the Zn extraction significantly increased to 87%. As only 60% of Zn present in the initial mixture comes from jarosite sludge, it is clear that a significant part of Zn from BOF fines is being leached as well.

Example 5 Comparison of Using Jarosite and Ferric Sulphate as a Source of SO3(g)

In this example, the effect on the non-ferrous metal recovery of an iron containing mineral waste stream (Goethite sludge (G)) is compared using either a second mineral waste stream comprising sulphur (Jarosite sludge (J)) or commercial ferric sulphate (Ferric sulphate (Fs)), a virgin, pure chemical.

Mixtures were prepared, roasted and subsequently leached in distilled water in order to test and compare the effect of both sulphur sources (i.e. jarosite and ferric sulphate) on the conversion of zinc ferrite into water soluble zinc sulphate and the resulting Zn leachability.

This example refers to the paper Four different mixtures were prepared. In mixtures 1 and 2 the molar ratio ferric sulphate/zinc ferrite is 1.2, as it is described in reference The chemical composition of the initial streams and prepared mixtures are listed in Table 6 and Table 7, respectively.

TABLE 6

Chemical composition of the initial goethite, jarosite and ferric sulphate (measured by XRF)

| | Composition [wt. %] | | | | | | |
|---|---|---|---|---|---|---|---|
| Sample | Fe | Zn | Pb | S | As | Si | Ca |
| Goethite sludge (G) | 31.8 | 5.73 | 1.61 | 9.24 | 0.38 | 0.82 | 5.91 |
| Jarosite sludge (J) | 16.4 | 1.94 | 2.80 | 32.6 | 0.56 | 0.50 | 2.44 |
| Ferric sulphate (Fs) | 25.1 | — | — | 25.5 | — | — | — |

TABLE 7

Chemical composition of the four mixtures investigated in this example (measured by XRF)

| Mixture No. | Description | Composition [wt. %] | | | | | | |
|---|---|---|---|---|---|---|---|---|
| | | Fe | Zn | Pb | S | As | Si | Ca |
| 1 | G:Fs weight ratio = 5:2 | 30.2 | 3.9 | 1.1 | 14.4 | 0.3 | 1.1 | 3.7 |
| 2 | G:J weight ratio = 5:2 | 28.1 | 4.6 | 2.0 | 17.6 | 0.5 | 1.6 | 4.5 |

TABLE 7-continued

Chemical composition of the four mixtures investigated in this example (measured by XRF)

| Mixture No. | Description | Composition [wt. %] | | | | | | |
|---|---|---|---|---|---|---|---|---|
| | | Fe | Zn | Pb | S | As | Si | Ca |
| 3 | G:Fs weight ratio = 1:4 | 25.5 | 1.0 | 0.3 | 22.1 | 0.1 | 0.4 | 1.1 |
| 4 | G:J weight ratio = 1:4 | 19.8 | 2.7 | 2.6 | 32.6 | 0.6 | 1.8 | 3.0 |

The weight ratios of 5:2 in the mixtures 1 and 2 are based on the molar ratio ferric sulphate/zinc ferrite equal to 1.2, as it is described in reference The roasted mixtures were leached in distilled water at the conditions described in the Example 1. After leaching and filtration, the solid samples were dried at 40° C. for 24 hours and were analyzed by XRF. Leachates were analyzed by ICP-OES. The chemical composition of the solid residues and leachates after leaching the mixtures in distilled water are shown in Table 9 and Table 10, respectively.

TABLE 9

Chemical composition of the solid residues after water leaching

| | [wt. %] | | | | | | |
|---|---|---|---|---|---|---|---|
| Mixture | Fe | Zn | Pb | S | As | Si | Ca |
| 1 | 48.1 | 3.1 | 2.0 | 5.0 | 0.4 | 1.5 | 3.9 |
| 2 | 41.7 | 4.0 | 3.0 | 5.7 | 0.7 | 2.5 | 4.1 |
| 3 | 63.0 | 0.4 | 0.8 | 1.5 | 0.2 | 0.7 | 1.0 |
| 4 | 39.3 | 0.9 | 4.8 | 5.8 | 1.3 | 4.0 | 3.4 |

TABLE 10

Chemical composition of the leachates after water leaching

| | [mg/L] | | | | | | |
|---|---|---|---|---|---|---|---|
| Mixture | Fe | Zn | Pb | Ca | As | Mg | pH |
| 1 | <3 | 3616 | <25 | 681 | <50 | 169 | 5.43 |
| 2 | <3 | 3108 | <25 | 679 | <50 | 169 | 5.49 |
| 3 | 53 | 2711 | <25 | 620 | <50 | 79 | 3.21 |
| 4 | <3 | 4556 | <25 | 637 | <50 | 112 | 5.18 |

Based on the results of the ICP-OES analysis, Zn recovery by water leaching was calculated for all four mixtures. Final Zn extractions are shown in FIG. 6.

Figure 6:
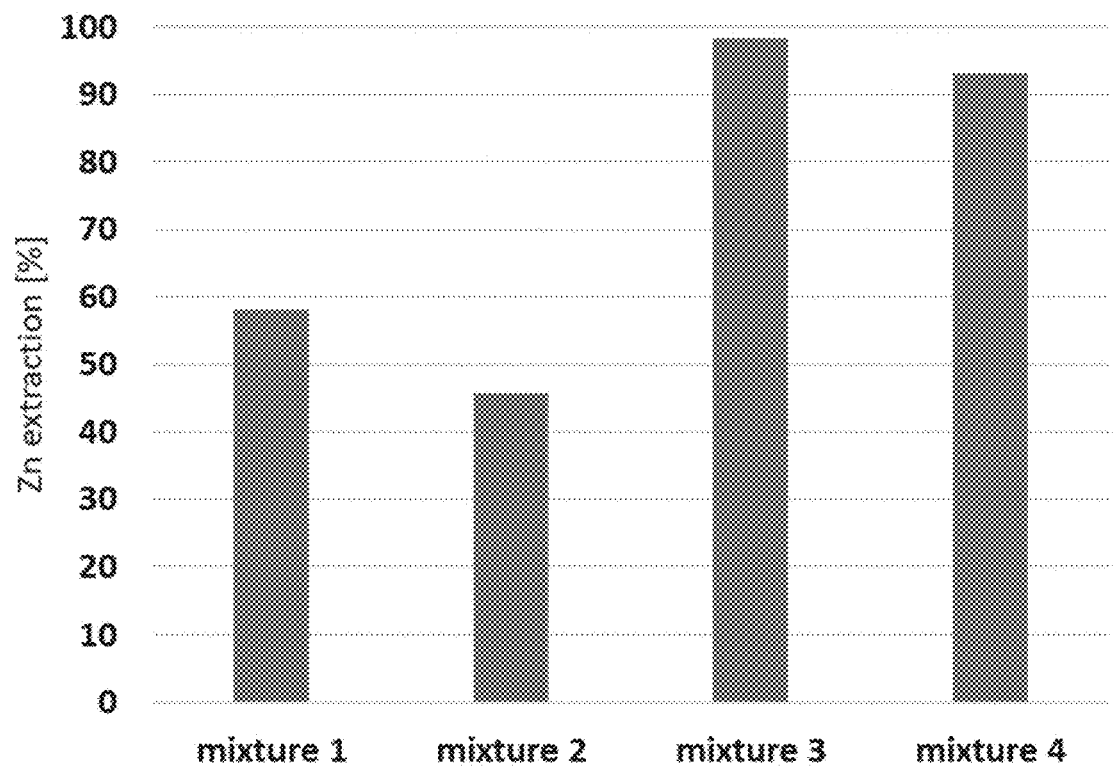
FIG. 6 represents experimental results of Zn extractions from roasted mixtures after water leaching.
Figure 7:
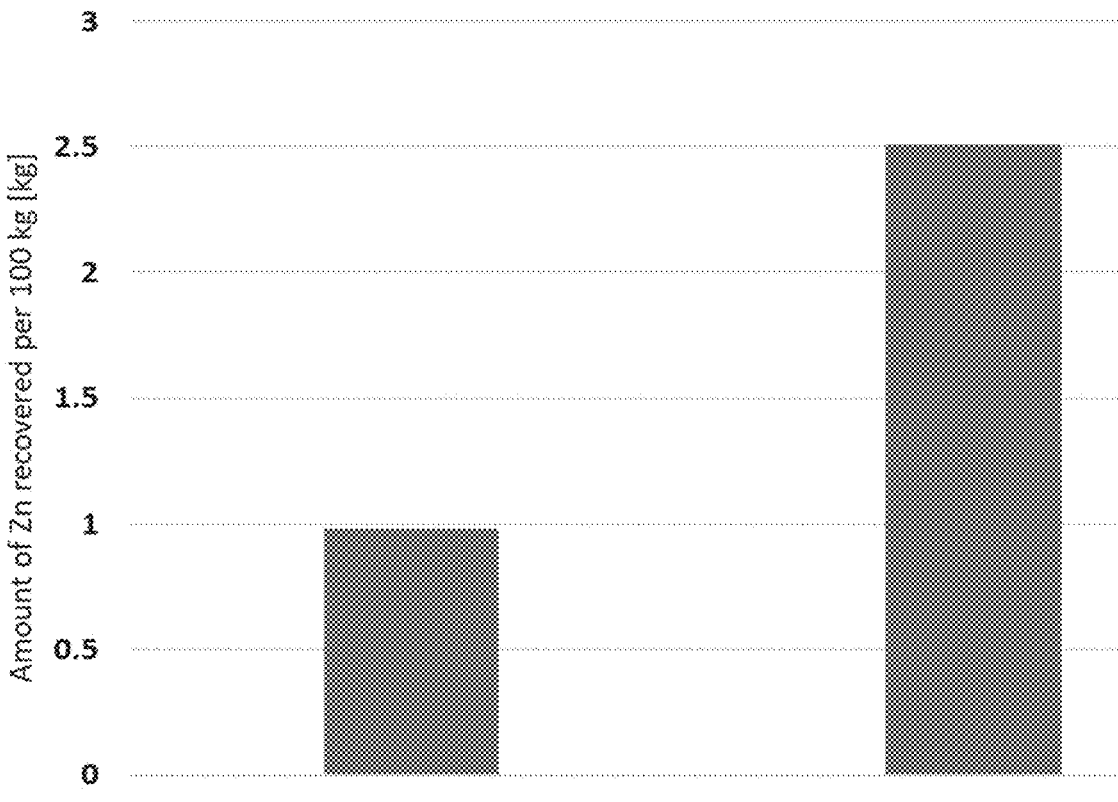
FIG. 7 represents the amount of Zn recovered per 100 kg of a mixture treated by roasting and water leaching.

As can be seen from FIG. 6, in case when molar ratio ferric sulphate/zinc ferrite equals 1.2, in accordance with the teaching of Another important difference was the applied experimental set up. In case of the present disclosure an open reactor system is used, whereas in reference In case of mixtures 3 and 4, applying the method of example 1 with instead of a molar ratio similar to reference As can be clearly seen from FIG. 7, using a second mineral waste stream comprising sulphur, in particular jarosite, instead of pure ferric sulphate leads to a higher amount of Zn recovered for a given weight of mixture.

The invention claimed is:

1. A process for recovering a non-ferrous metal from a first solid residue comprising iron, the process comprising:
mixing the first solid residue with a second solid residue comprising sulfur thereby obtaining a particulate mixture,
roasting the particulate mixture at a temperature of at least 650° C. to obtain a roasted mixture, and
leaching the roasted mixture in a liquid at a pH of at least 5.5 to obtain a solution enriched with the non-ferrous metal,
wherein the second solid residue comprises the non-ferrous metal, and
wherein the particulate mixture comprises a stoichiometric ratio of sulfur to the non-ferrous metal of at least 8:1.

2. The process of claim 1, wherein the first solid residue comprises at least 15% iron (Fe) by weight.

3. The process of claim 1, wherein the non-ferrous metal is present in the first solid residue as an iron spinel of the non-ferrous metal for at least 20% by weight.

4. The process of claim 1, wherein the non-ferrous metal is zinc.

5. The process of claim 4, wherein the first solid residue comprises at least 20% by weight zinc ferrite.

6. The process of claim 1, wherein the first solid residue is one or a combination of the following: goethite residue from metallurgical processing of zinc, Basic Oxygen Furnace dust, and Electric Arc Furnace dust.

7. The process of claim 1, wherein the second solid residue comprises at least 15% by weight sulphate minerals.

8. The process of claim 1, wherein the second solid residue is a jarosite residue from metallurgical processing of zinc.

9. The process of claim 1, wherein the first solid residue and the second solid residue are mixed in proportions such that the particulate mixture comprises an amount of sulfur at least equal to a stoichiometric amount of the non-ferrous metal in the particulate mixture.

10. The process of claim 1, wherein one or more of the first solid residue, the second solid residue, and the particulate mixture has a particle size distribution with 50 percentile diameter ($d_{50}$) equal to or smaller than 100 μm.

11. The process of claim 1, wherein the roasting is performed at a temperature between 675° C. and 800° C.

12. The process of claim 1, wherein the leaching is performed in water at a temperature between 10° C. and 90° C., wherein a weight ratio of the water to the roasted mixture is at least 1:1.

13. The process of claim 12, wherein a weight ratio of water to roasted mixture is between 5:1 and 15:1.

14. The process of claim 12, wherein the leaching is performed at a temperature between 15° C. and 50° C.

15. The process of claim 1, wherein the non-ferrous metal is zinc and the first solid residue comprises at least 30% by weight zinc ferrite, wherein the second solid residue comprises at least 15% by weight sulphate minerals, wherein the roasting is performed at a temperature between 675° C. and 800° C., and wherein the leaching is performed in water at a liquid to solid ratio of at least 5:1 and at a temperature between 15° C. and 50° C.

16. The process of claim 15, wherein the second solid residue is jarosite.

17. The process of claim 7, wherein the second solid residue is jarosite.

18. The process of claim 1, wherein the first solid residue and the second solid residue comprise the non-ferrous metal.

* * * * *